United States Patent [19]

Yamada

[11] 4,243,000
[45] Jan. 6, 1981

[54] INDUCTION SYSTEM OF MULTI-CYLINDER ENGINE

[75] Inventor: Minoru Yamada, Iwata, Japan

[73] Assignee: Yamaha Hatsukoki Kabushiki Kaisha, Iwata, Japan

[21] Appl. No.: 965,485

[22] Filed: Dec. 1, 1978

[30] Foreign Application Priority Data

Mar. 15, 1978 [JP] Japan ............................ 53-30060

[51] Int. Cl.³ .......................................... F02M 13/06
[52] U.S. Cl. .................................. 123/442; 123/432
[58] Field of Search ............... 123/127, 75 B; 261/65, 261/23 A, 44 R, 50 A; 251/305, 306

[56] References Cited

U.S. PATENT DOCUMENTS

| | | | |
|---|---|---|---|
| 1,977,351 | 10/1934 | Phillips | 251/306 |
| 2,385,510 | 9/1945 | Harwood | 251/306 |
| 2,586,927 | 2/1952 | Fantz | 251/306 |
| 2,657,896 | 3/1953 | Muller | 251/306 |
| 3,543,736 | 12/1970 | Suzuki | 123/75 B |
| 3,713,630 | 1/1973 | Laprade | 261/50 A |
| 4,086,885 | 5/1978 | Noguchi | 123/75 B |
| 4,094,931 | 6/1978 | Karino | 123/127 |
| 4,099,492 | 1/1977 | Asaka | 123/127 |

*Primary Examiner*—Ronald H. Lazarus
*Attorney, Agent, or Firm*—Ernest A. Beutler

[57] ABSTRACT

An induction system for a multi-cylinder internal combustion engine that improves fuel efficiency and reduces the emission of unwanted exhaust gas constituents, particularly at the low and medium load conditions. The engine induction system comprises a plurality of separate carburetor barrels which, at least under some running conditions, serve cylinders separately from each other through main induction passages. One carburetor barrel is provided with a different fuel discharge system than the other carburetor barrels for accomodating a certain engine operating condition. A separate sub-intake system connects this carburetor barrel with other cylinders not normally served by the particular carburetor barrel in question. This sub-intake system has a substantially smaller cross-sectional area in the main intake system so that the charge drawn into the cylinders through the sub-intake system enters at a substantially higher velocity. This improves combustion by creating turbulence under at least some operating conditions. Several embodiments of throttle valve constructions are disclosed for insuring complete closure and sealing of at least one throttle valve of the induction control system for precluding leakage. In some embodiments this is accomplished by providing a resilient section in the throttle body and in other embodiments the result is obtained by providing a resilient seal on the periphery of the throttle valve.

11 Claims, 14 Drawing Figures

INDUCTION SYSTEM OF MULTI-CYLINDER ENGINE

BACKGROUND OF THE INVENTION

This invention relates to an induction system for an internal combustion engine and more particularly to an improved throttle valve for an internal combustion engine.

In many internal combustion engine induction systems it is desireable to provide a throttle valve for controlling flow through an induction passage which will insure complete closure during a certain phase of the operation. Although such a result can be obtained by maintaining extremely close tolerances, such a solution presents substantial cost penalties and in some instances excessive machining operations.

It is, therefore, a principal object of this invention to provide an improved throttle valve construction for an internal combustion engine induction system that will insure complete sealing under certain conditions.

It is another object of the invention to provide a throttle valve construction for an internal combustion engine which is effective in operation and yet low in manufacturing costs.

Recently it has been discovered that engine operation (both emission of unwanted exhaust gas constituents and fuel economy) can be improved, particularly at idle and low load operation by providing a sub-intake system through which a substantial portion of the induction charge flows to the combustion chambers under these operating conditions. By using a relatively small cross-sectional area induction system turbulence and, if desired, swirl may be generated in the combustion chamber at the time of ignition. As such, smoother and more efficient combustion results under these load conditions.

It has been proposed to control the flow through the sub-intake system by means of a main throttle valve and an auxiliary or sub-throttle valve which operate in sequence so as to cause substantially all of the idle and low load charge requirements to enter the combustion chambers through the sub-intake passage and to provide an increased flow through the main induction passage as the engine load increases. In connection with the adaptation of this concept to multiple chamber engines having multiple carburetor barrels, it has been proposed to provide only one of the carburetor barrels with a system for accommodating certain engine operating conditions. This one carburetor barrel can serve a plurality of chambers through the combined sub-intake passages, all of which are fed from this one carburetor barrel. An example of an application of this principal to a multiple cylinder engine may be found in the copending application of Hiromitsu Matsumoto, Ser. No. 838,353, entitled Control of Carburetor Supplied Induction System, filed Sept. 30, 1977 and assigned to the assignee of this application, such an arrangement being shown specifically in the embodiment of FIGS. 6–10 of that application.

With an arrangement as disclosed in that application, it is important that the throttle valves of the induction systems associated with the carburetors that serve other than the specific condition are accurately closed and do not permit any leakage during operation under the one specific condition. If these throttle valves were not fully closed, leakage might occur which would dilute the mixture strength entering the other cylinders and result in uneven running and poor overall performance.

It is, therefore, another object of this invention to provide an improved throttle construction for a multiple cylinder multiple carburetor barrel engine induction system.

SUMMARY OF THE INVENTION

This invention is adapted to be embodied, in a first form, in an induction system for an internal combustion engine and providing an improved arrangement for effecting sealing of a butterfly type throttle valve. A throttle valve is rotatably supported in an induction passage for controlling the flow therethrough. The throttle valve and the induction passage have adjacent surfaces justaposed to each other when the throttle valve is in its closed position. In connection with this feature of the invention, means are incorporated for providing a seal between the surfaces when the throttle valve is closed to effectively preclude any leakage past the throttle valve.

Another important feature of the invention is adapted to be embodied in a multiple cylinder internal combustion engine having at least two variable volume chambers in which combustion occurs. First and second charge forming devices are provided which each serve a respective chamber through respective first and second main induction passages. An auxiliary induction passage connects the first charge forming device with each of the chambers for delivering a charge from the first charge forming device to each of the chambers. This first charge forming device has supply means for supplying a charge adapted to serve a specific engine output condition for each of the chambers. The second charge forming device is devoid of such a specific supply means. Valve means control the communication of the charge forming devices with each of the chambers through the respective induction passages. The valve means include at least a pair of butterfly type throttle valves each of which controls the flow through a respective one of the main induction passages. In accordance with this feature of the invention, the throttle valve associated with the second main induction passage and this passage have adjacent surfaces juxtaposed to each other when this throttle valve is in its closed position and means provide a seal between these surfaces when the throttle valve is closed to effectively preclude any leakage passed through this throttle valve.

DETAILED DESCRIPTION OF THE PREFERRED EMBODIMENTS

This invention is adapted to be embodied in a multiple cylinder engine having a plurality of carburetors or carburetor barrels. An induction system consisting of main and sub-intake passages connects the carburetor barrels with respective cylinders. As disclosed in the aforenoted embodiment of copending application Ser. No. 838,353, one carburetor barrel serves a plurality of cylinders through the sub-intake passages during a certain operating condition. In the illustrated embodiment, only two carburetor barrels and their association with two adjacent cylinders of the engine have been shown. It is to be understood that the invention may be used with any number of cylinders, two or greater, and with any number of carburetor barrels. In addition, one carburetor barrel may serve all of the cylinders of an engine for a given operating condition or, alternatively, the one carburetor barrel may serve any number of cylinders less than the total number for a given engine.

Figure 1:
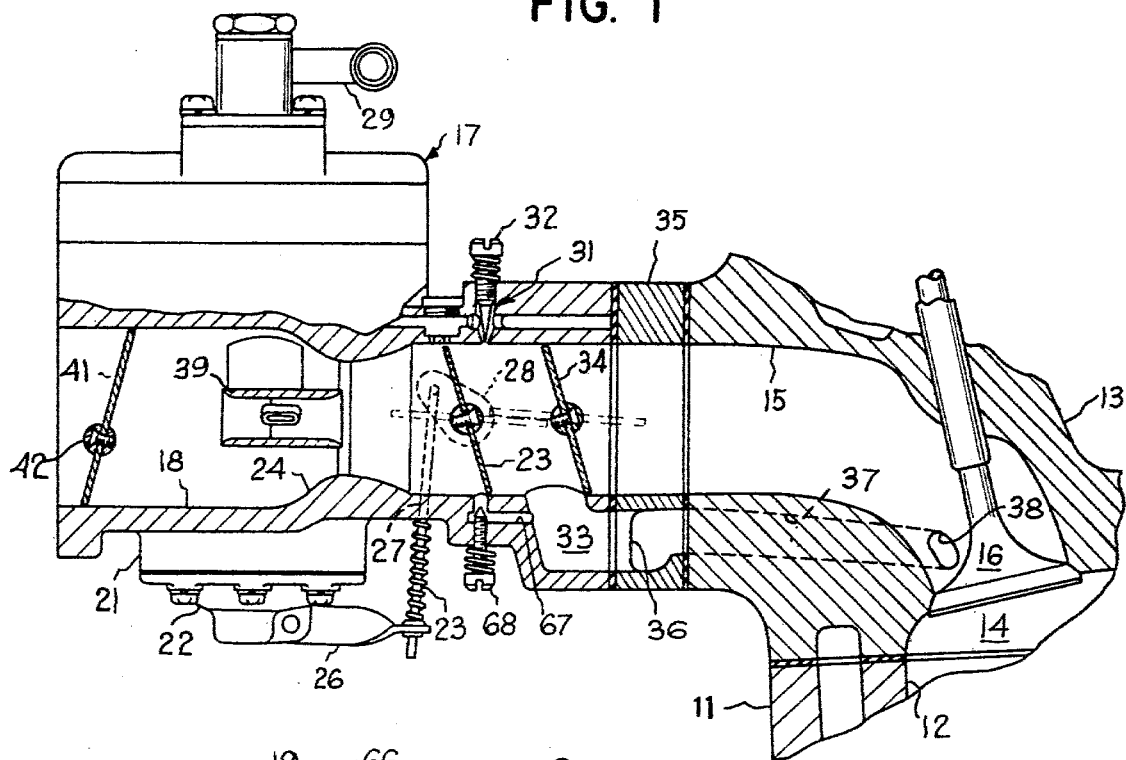
FIG. 1 is a longitudinal sectional view taken through one cylinder of a multi-cylinder engine and specifically the cylinder served by the main carburetor barrel embodying the invention and taken generally along the line 1—1 of FIG. 2.
Figure 2:
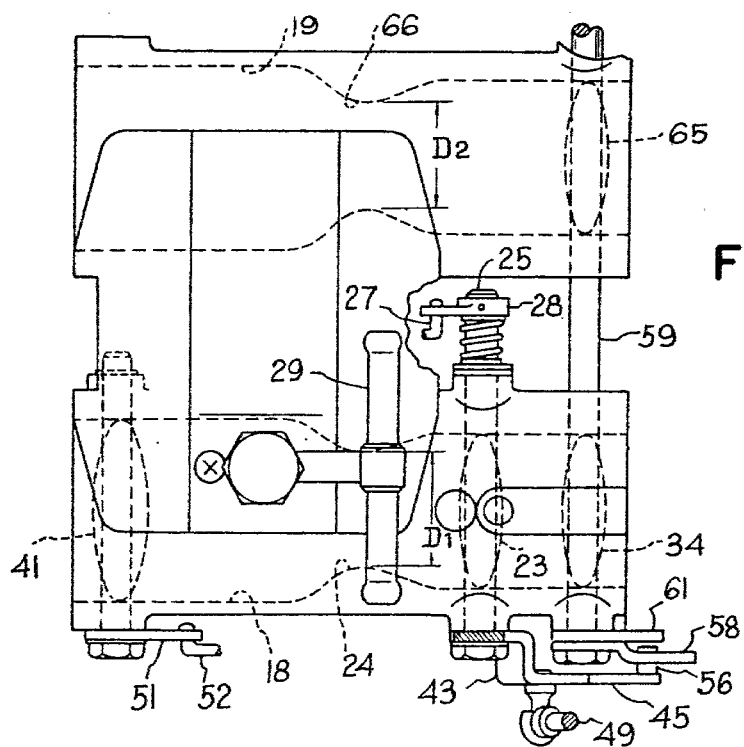
FIG. 2 is a top plan view of one two-barrel carburetor of the induction system constructed in accordance with the invention.

Referring now specifically to the drawings and considering first FIG. 1, an engine constructed in accordance with this engine has a cylinder block 11 that is provided with a plurality of cylinder bores 12, only one of which appears in the drawing. Pistons (not shown) are supported for reciprocation in the cylinder bores 12 in a known manner. A cylinder head 13 is affixed to the cylinder block 11 and defines with the cylinder bores 12 and respective pistons, a plurality of combustion chambers 14. For each combustion chamber 14, a main intake passage 15 extends through the cylinder head 13 and the communication of the main intake passage 15 with the respective combustion chamber 14 is controlled in a known manner by an intake valve 16.

A two-barrel carburetor 17 is affixed to the cylinder head 13 for each adjacent pair of combustion chambers 14. The carburetor 17 includes a main barrel 18 and a secondary barrel 19 which serve respective, adjacent intake passages 15. The carburetor barrels 18 and 19 are served by a common float chamber 21 and accelerating pump 22.

A main throttle valve 23 is positioned in the main carburetor barrel 18 downstream of its respective venturi section 24. The main throttle valve 23 is supported in the carburetor body upon a throttle valve shaft 25.

The accelerating pump 22 includes an accelerating pump lever 26 that is actuated by means of a link 27 that is connected to a lever 28 affixed to the throttle valve shaft 25 in a known manner.

Fuel is supplied to the float chamber 21 in a known manner by means including an inlet fitting 29.

The carburetor barrel 18 and only this barrel of the carburetor 17 is provided with an idle and low speed fuel discharge circuit, indicated generally by the reference numeral 31, having an adjusting needle 32. Idle and low speed fuel requirements for the two cylinders served by the carburetor 17 is all supplied by the carburetor barrel 18 via a supplemental or sub-intake system now to be described.

The sub-intake system includes an inlet passage 33 formed in the carburetor barrel 18 downstream of the main throttle valve 23 and upstream of a sub-throttle valve 34 that is also positioned in this carburetor barrel. A spacer plate 35, which is positioned between the carburetor 17 and the cylinder head 13 and which may be formed from a heat insulating material is formed with a sub-intake passage 36 that receives a charge from the carburetor sub-intake inlet passage 33 and which branches to cylinder head sub-intake passages 37 serving two adjacent combustion chambers 14. The cylinder head intake passages 37 each terminate in respective sub-intake ports 38 that are juxtaposed to the intake valve 16. The sub-intake passages 37 are of substantially less cross-sectional area than the main intakes passages 15 so that a given mass flow through these passages will enter the chambers 14 at a substantially higher velocity. If desired, the sub-intakes passages 37 and ports 38 may be directed so as to also impart a swirl to the intake charge.

In addition to the idle and low speed circuit 31, the carburetor barrel 18 is provided with a main fuel discharge, including a boost nozzle 39. A similar main fuel discharge is also provided in the carburetor barrel 19 which serves the chamber adjacent the chamber 14 shown in FIG. 1.

A choke valve 41 is rotatably supported upon a shaft 42 in only the carburetor barrel 18 upstream of the venturi 24 and boost nozzle 39. As is known, the choke valve 41 provides cold starting enrichment and, as will become apparent, this cold starting enrichment serves all of the chambers fed by the sub-intake passages 33, 36 and 37. Thus, only one carburetor barrel need be provided with a cold starting enrichment device as described in the aforenoted copending application Ser. No. 838,353.

Figure 3:
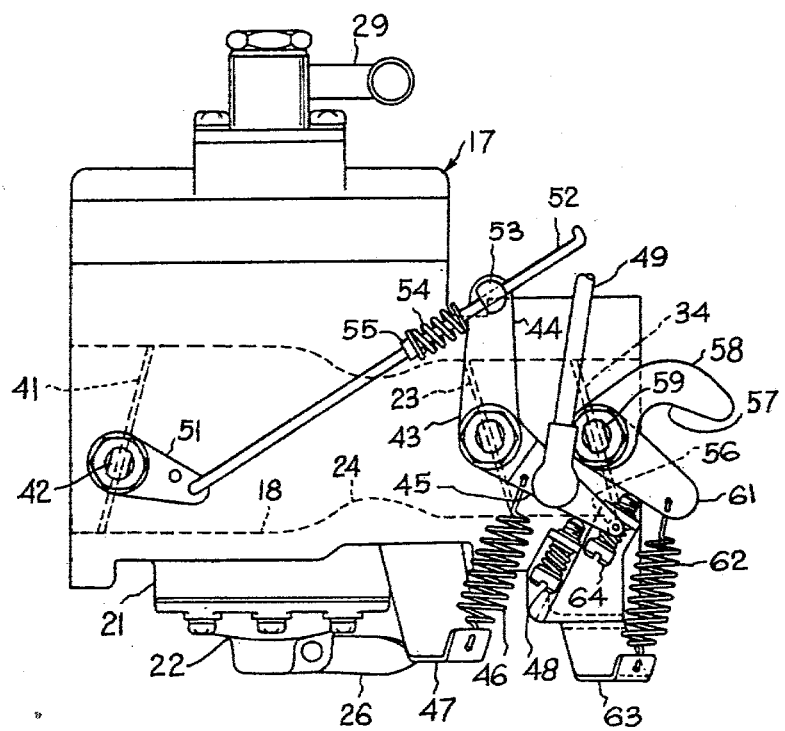
FIG. 3 is a side elevational view of the carburetor shown in FIG. 2.

The linkage system for controlling the operation of the main throttle valve 23 and the sub-throttle valve 34 will now be described by particular reference to FIG. 3. A bellcrank 43 is affixed to the throttle valve shaft 25 and has arms 44 and 45. A throttle return spring 46 is interconnected between the arm 45 and a bracket 47 affixed to the carburetor body for returning the throttle valve 23 to its idle position. This idle position is determined by an adjustable screw stop 48 that is juxtaposed to the outer end of the bellcrank arm 45. An operator controlled accelerator link 49 is also affixed to the bellcrank arm 45 for actuating the throttle valve 23 in a known manner.

The choke valve 41 may be operated either manually or automatically and the actuating structure for it is not illustrated since any conventional structure may be used. An unloader mechanism is, however, illustrated which is comprised of a lever 51 that is affixed to the choke shaft 42 and which is pivotally connected to an extending link 52. The link 52 passes with a clearance through a pin 53 that is carried by the arm 44 of the throttle valve shaft bellcrank 43. A spring 54 is transposed between the pin 53 and a shoulder that is stacked to the link 52. As is well known, the unloader mechanism will permit positioning of the choke valve 41 in the desired position without interfering with the operation of the throttle valve 23. However, full opening of the throttle valve 23 will cause the pin 53 to engage the spring 54 and act upon the link 52 to partially open the choke valve 41.

The sub-throttle valve 34 is controlled in sequence with the main throttle valve 23 so that the sub-throttle valve 34 will be progressively opened and to cause a larger portion of the mixture flowing into the chambers 14 to flow through the main intake passages 15 as the primary throttle valve 23 moves to its fully opened position. The mechanism for achieving this result comprises a pin 56 that is carried at the end of the bellcrank arm 43 and which is adapted to engage a cam surface 57 formed on one arm 58 of a bellcrank that is affixed to the sub-throttle shaft 58. The bellcrank has a second arm 61 to which one end of a tension spring 62 is affixed. The opposite end of the tension spring 62 is connected to a bracket 63 that is fixed to the carburetor body so as to urge the arm 61 into engagement with an adjustable stop 64.

A throttle valve 65 is positioned in the carburetor barrel 19 downstream of its venturi section 66 for controlling the flow through the carburetor barrel 19. The throttle valve 65 is affixed to the shaft 59 so that it will be operated simultaneously with the sub-throttle valve 34. The shaft 59 may extend to other carburetor throttle valves (not shown) which serve the same purpose as the throttle valve 65 in the carburetor barrel 19.

FIG. 1 illustrates the throttle valves 23, 34 and 65 in their normal idling positions. In this position the sub-throttle valve 34 and the throttle valve 65 of the carburetor barrel 19 are fully closed. The throttle valve 23 is set at its idling position and the fuel air mixture dispersed by the idle discharge circuit 31 flows into the sub-intake inlet passage 33. The idling charge is then delivered to the respective chambers 14 through the spacer passage 36 and cylinder head sub-intake passage 37. Due to the relatively small size of the sub-intake passages 37, a high velocity is imparted to the idle mixture which significantly increases the turbulence in the chamber 14 at the time of ignition and thus speeds flame propagation and improves combustion and efficiency. The idle mixture may also be adjusted by controlling the rate of flow through a bypass passage 67 formed in the carburetor body past the main throttle valve 23. An adjustment screw 68 controls the flow through the passage 67.

As the throttle valve 23 is progressively opened, the pin 56 will eventually contact the cam surface 57 of the lever 58 affixed to the sub-throttle valve shaft 59. Up until this time, all of the fuel air mixture for the chambers 14 will be supplied through the sub-intake passages 33, 36 and 37. During this phase of the engine operation, the carburetor barrel 18 will be serving all of the chambers 14 and the carburetor barrel 19 will be inactive.

In a preferred embodiment of the invention, the sub-throttle valve 34 and throttle valve 65 are initially opened when the engine is operating at about one-third of its rated output. The rate of opening of the sub-throttle valve 34 and throttle valve 65 in relation to further opening of the primary throttle valve 23 will depend upon the contour of the cam surface 57.

It should be apparent that as the engine load increases a larger proportion of the mixture will be gradually supplied by the carburetor barrels 19 to their respective chambers and past the open sub-throttle valve 34 to the chamber served by the main intake passage 15. Said another way, each individual carburetor barrel 18 or 19 will begin to supply its respective combustion chamber 14 at the higher load ranges of the engine.

As has been noted, only the carburetor barrel 18 is provided with a choke valve 41. Even though the choke valve 41 is in its fully opened position, the carburetor barrel 18 will have a slightly greater resistance to flow than will the unchoked barrel 19. This can result in uneven mixture delivery to the cylinders served by these barrels if not compensated for. Various arrangements for compensating for this problem are disclosed in my copending applications entitled Induction System for Multi-Cylinder Engine, Ser. Nos. 10,932 and 10,930 both filed Feb. 9, 1979.

In order to insure uniformity of mixture between adjacent chambers 14 and particularly those not served directly by the carburetor barrel 18 except through the sub-intake system, it is essential that the throttle valves 65 associated with these other chambers 14 provide an effective seal. In accordance with this invention, several embodiments are disclosed which will insure effective sealing between the throttle valve 65 and the adjacent surface 67 of the carburetor barrel 19.

Figure 4:
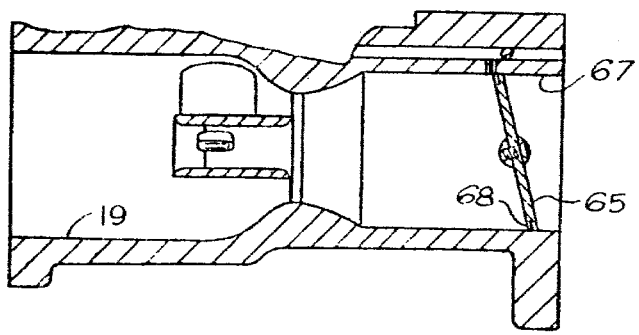
FIG. 4 is a longitudinal cross-sectional view taken along the line 4—4 of FIG. 1.
Figure 5:
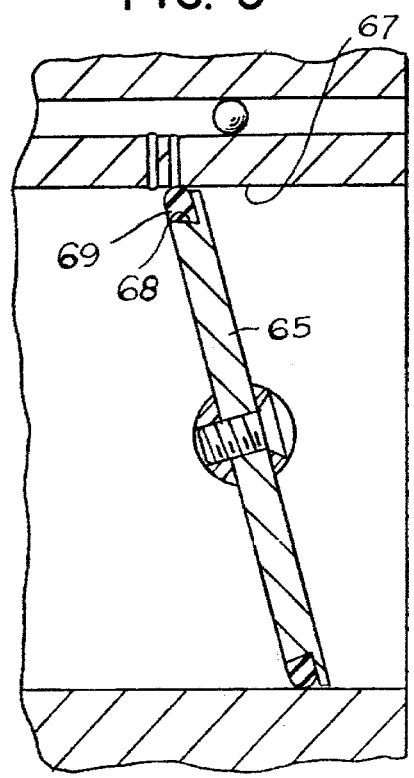
FIG. 5 is an enlarged cross-sectional view of the throttle valve shown in FIG. 4.

Referring first to the embodiment shown in most detail in FIGS. 4 and 5, the periphery of the throttle valve 65 is formed with a recessed groove 68 in which an elastic sealing ring 69 is received. The sealing ring 69 is constructed from teflon or some other hard, wear resisting, resilient material that will effect a good seal with the carburetor barrel surfaces 67 when the throttle valve 65 is in its closed position.

Figure 6:
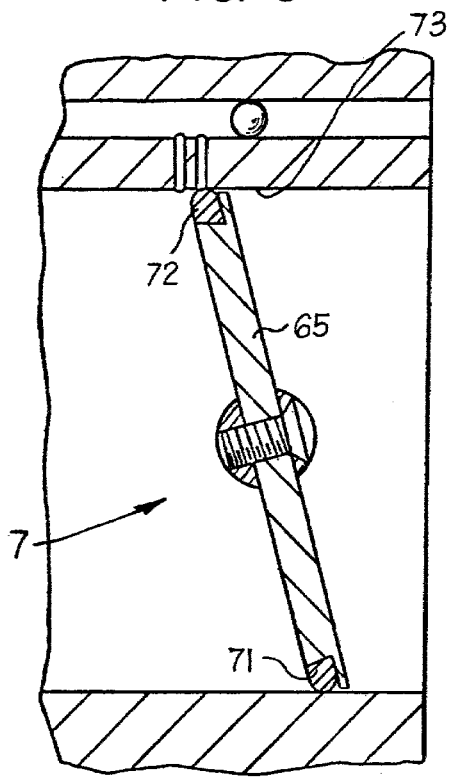
FIG. 6 is an enlarged cross-sectional view, in part similar to FIG. 5, showing another embodiment of the invention.
Figure 7:
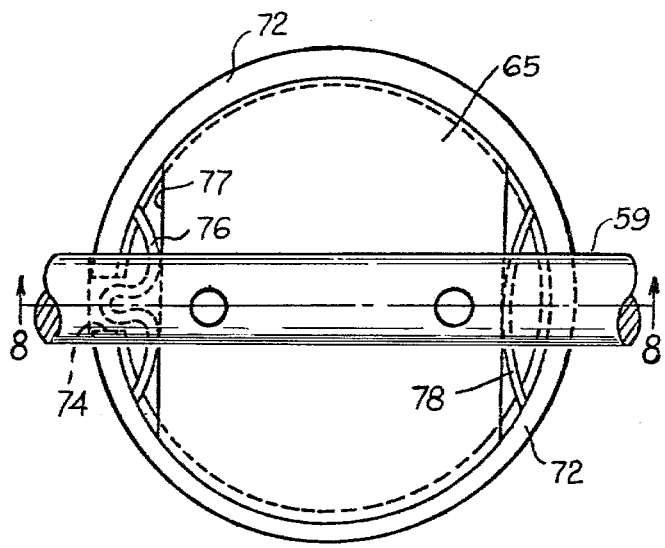
FIG. 7 is an elevational view of the embodiment of FIG. 6 taken generally in the direction of the arrow 7.
Figure 8:
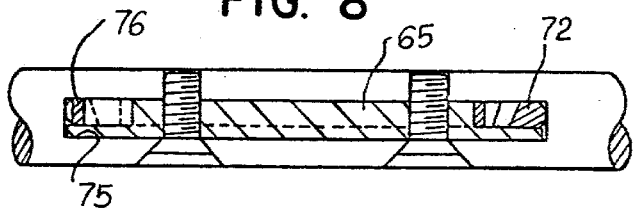
FIG. 8 is a cross-sectional view of the embodiment shown in FIG. 6 taken generally in the direction of the line 8—8 in FIG. 7.

Another embodiment of the invention is shown in FIGS. 6–8. In this embodiment, as in the embodiment of FIGS. 4 and 5, the throttle valve 65 is formed with a recessed groove 71. In connection with this embodiment, a metallic sealing ring 72 is interposed in the groove 71 for effecting a seal with the carburetor barrel surface 73. The sealing ring 72 is similar to a piston ring and is slotted, as at 74 between its ends. The throttle valve 65 is supported within a slot 75 of the shaft 59. Preferably, the slot 74 of the sealing ring 72 is positioned in an area surrounded by the shaft 59, as shown in FIG. 7, to further assist in sealing.

The ring 72 is held against rotation relative to the shaft 59 and throttle valve 65 by means of a specially formed spring 76 (FIG. 7) which bears against a shoulder 77 of the throttle valve 65. In addition, the spring 76 resiliently urges the sealing ring 72 outwardly into engagement with the barrel shoulder 73. An arcuate spring 78 is positioned at the diametrically opposite side of the valve 65 for also providing a resilient outward bias to the sealing ring 72.

Figure 9:
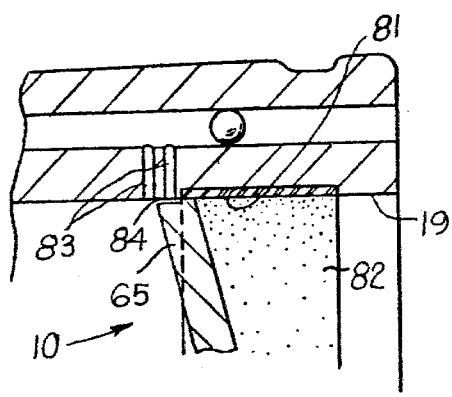
FIG. 9 is a partial cross-sectional view, in part similar to FIGS. 5 and 6, showing another embodiment of the invention.
Figure 10:
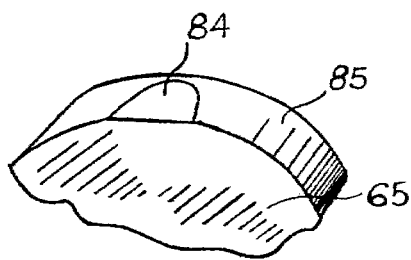
FIG. 10 is a fragmentary elevational view of the embodiment of FIG. 9, taken in the direction of the arrow 10.

FIGS. 9 and 10 illustrate still a further embodiment of this invention. In this embodiment, the surfaces of the barrel 19 adjacent the closed position of the throttle valve 65 is formed with a circumferential recess 81 in which a ring 82 of elastic material, such as teflon or some other suitable hard, wear resisting, resilient material is positioned.

When the throttle valve 65 is in its closed position, it will bear against and form an effective seal with the resilient ring 81. In some instances, if there are fuel discharge ports 83 positioned adjacent the closed position of the throttle valve 65, it may be desireable for control of discharge timing to provide notches 84 in a tapered front surface 85 of the throttle valve 65. These notches and their configuration may be best understood by reference to FIG. 10.

Figure 11:
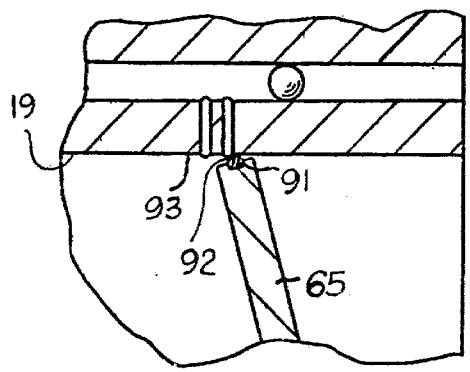
FIG. 11 is a fragmentary view, in part similar to FIG. 9, showing still a further embodiment of the invention.

FIG. 11 illustrates a still further embodiment of the invention of the type in which a sealing ring, indicated generally by the reference numeral 91, is supported in a peripheral groove 92 of the throttle valve 65. The sealing ring 91 in this embodiment is adapted to engage the adjacent surface 93 of the carburetor barrel 19 in the closed position to provide sealing. In this embodiment, the sealing ring 91 may be formed from teflon or similar materials, as previously described, and has a generally trapezoidal shape.

Figure 12:
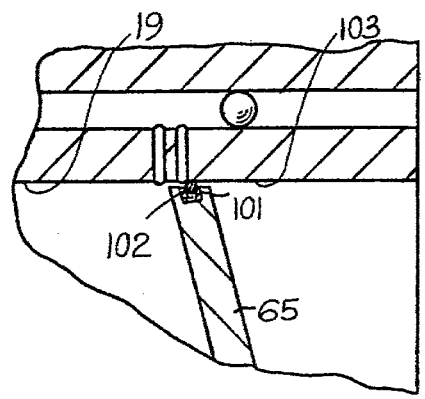
FIG. 12 is a fragmentary view, in part similar to FIGS. 9 and 11, showing still a further embodiment of the invention.

FIG. 12 shows a similar embodiment in which a composite seal 101 is positioned within a groove 102 of the throttle valve 65 for sealing with the adjacent surface 103 of the barrel 19 when the throttle valve 65 is closed.

Figure 13:
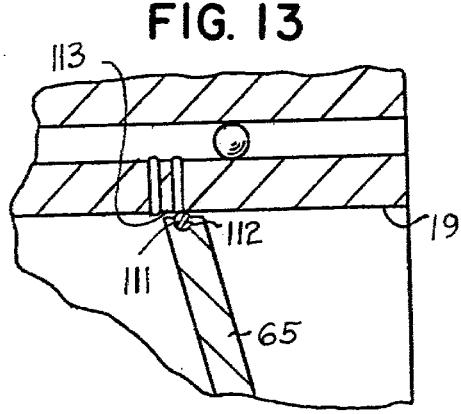
FIG. 13 is a fragmentary cross-sectional view, in part similar to FIGS. 9, 11 and 12 showing yet another embodiment of the invention.

FIG. 13 illustrates yet another embodiment in which an o-ring type seal 111 is positioned in a semi-circular groove 112 in the periphery of the throttle valve 65 to sealingly engage the adjacent surface 113 of the carburetor barrel 19.

Figure 14:
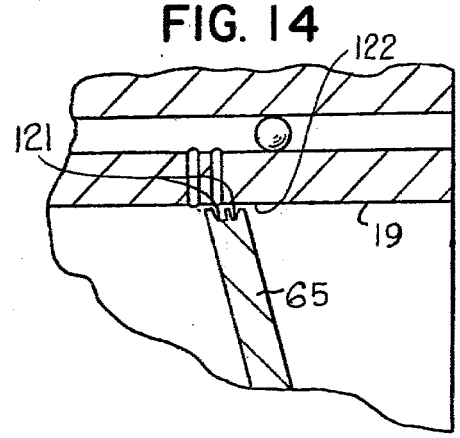
FIG. 14 is a fragmentary cross-sectional view, in part similar to FIGS. 9, 11 and 13, showing yet another embodiment of the invention.

All of the embodiments previously described include resilient sealing elements. FIG. 14 illustrates an embodiment wherein a labyrinth type seal is employed. In connection with this embodiment, the periphery of the throttle valve 65 is formed with a plurality of grooves 121 that are juxtaposed to the surface 122 of the carburetor barrel 19 when the throttle valve 65 is in its closed position. The grooves 121 provide a labyrinth type seal which will effectively preclude leakage, as in the previously described embodiments.

It is to be understood that the foregoing description is that of preferred embodiments of the invention and that various changes and modifications may be made without departing from the spirit and scope of the invention as defined by the appended claims.

I claim:

1. In an internal combustion engine having at least two variable volume chambers in which combustion occurs, a first charge forming device, a second charge forming device, first and second main induction passages, each connecting a respective one of said charge forming devices with a respective one of said chambers only for delivering a charge from the charge forming device to the respective chamber, an auxiliary induction passage connecting said first charge forming device with each of said chambers for delivering a charge from said first charge forming device to each of said chambers, said first charge forming device having supply means to supply a charge adapted to serve a specific engine operating condition for each of said chambers, said second charge forming device being devoid of such a specific supply means, and valve means for controlling the rate of communication of said charge forming devices with said chambers through the respective induction passages, said valve means including a pair of throttle valves, each of said throttle valves controlling the flow through a respective one of said main induction passages, the improvement comprising the throttle valve in said second main induction passage and said second main induction passage having adjacent surfaces juxtaposed to each other when said throttle valve is in its closed position and means providing a seal between said surfaces when said throttle valve in said second main induction passage is closed to effectively preclude any leakage past said throttle valve.

2. An internal combustion engine as set forth in claim 1 wherein the means providing a seal is a resilient element carried by one of the surfaces.

3. An internal combustion engine as set forth in claim 2 wherein the resilient element comprises a section of the wall of the induction passage defining its respective surfaces.

4. An internal combustion engine as set forth in claim 2 wherein the resilient element is carried by the periphery of the throttle valve.

5. An internal combustion engine as set forth in claim 4 wherein the resilient element is a separate member.

6. An internal combustion engine as set forth in claim 5 wherein the resilient element comprises a non-metallic ring.

7. An internal combustion engine as set forth in claim 4 wherein the resilient member is a metallic ring.

8. An internal combustion engine as set forth in claim 7 wherein the metallic ring is split and further including biasing spring means interposed between said ring and the body of the throttle valve for urging said ring into sealing engagement with the induction passage surface.

9. An internal combustion engine as set forth in claim 7 wherein the throttle valve is mounted upon a shaft, said shaft having a slot through which said throttle valve extends, the gap provided by the slit ends of said ring being positioned within said shaft.

10. An internal combustion engine as set forth in claim 1 wherein the sealing means comprises a labyrinth seal.

11. An internal combustion engine as set forth in claims 1 or 2 further including a port extending through the induction passage surface adjacent the periphery of the throttle valve when the throttle valve is in its closed position, said throttle valve having reliefs from thereon on the upstream side thereof adjacent said port.

* * * * *

UNITED STATES PATENT AND TRADEMARK OFFICE
CERTIFICATE OF CORRECTION

PATENT NO. : 4,243,000
DATED : January 6, 1981
INVENTOR(S) : Minoru Yamada

It is certified that error appears in the above—identified patent and that said Letters Patent is hereby corrected as shown below:

Column 5, line 23, "58" should read -- 59 --.

*Signed and Sealed this*

*Twenty-sixth* Day of *May 1981*

[SEAL]

*Attest:*

RENE D. TEGTMEYER

*Attesting Officer*　　*Acting Commissioner of Patents and Trademarks*